(12) United States Patent
Koyama (10) Patent No.: US 11,305,669 B2
(45) Date of Patent: Apr. 19, 2022

(54) ELECTRONIC CONTROL DEVICE

(71) Applicant: DENSO CORPORATION, Kariya (JP)

(72) Inventor: Yutaka Koyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 16/893,618

(22) Filed: Jun. 5, 2020

(65) Prior Publication Data

US 2020/0384890 A1 Dec. 10, 2020

(30) Foreign Application Priority Data

Jun. 10, 2019 (JP) .............................. JP2019-108102

(51) Int. Cl.
*B60L 58/20* (2019.01)
*B60L 50/61* (2019.01)

(52) U.S. Cl.
CPC .............. *B60L 58/20* (2019.02); *B60L 50/61* (2019.02); *B60L 2210/40* (2013.01)

(58) Field of Classification Search
CPC ...... B60L 58/20; B60L 50/61; B60L 2210/40; B60L 3/04; B60L 3/0007; B60L 3/003; B60L 3/0084; Y02T 10/70; Y02T 10/62
USPC ....................................................... 320/104
See application file for complete search history.

(56) References Cited

U.S. PATENT DOCUMENTS

| 10,710,606 | B2* | 7/2020 | Tsujioka | ............... B60R 16/033 |
| 11,001,162 | B2* | 5/2021 | Yamada | .................. B60L 53/20 |
| 2012/0062158 | A1* | 3/2012 | Itou | ......................... B60L 50/16 318/400.21 |
| 2020/0169208 | A1 | 5/2020 | Koyama | |

FOREIGN PATENT DOCUMENTS

| JP | H10-028304 A | 1/1998 | |
| JP | 2008-206288 A | 9/2008 | |
| JP | 2019-161991 A | 9/2019 | |
| WO | WO-2016027427 A1 * | 2/2016 | ............ H02P 29/024 |

* cited by examiner

*Primary Examiner* — M Baye Diao
(74) *Attorney, Agent, or Firm* — Posz Law Group, PLC (57) ABSTRACT

An electronic control device including a first and second arithmetic units enables supply of electric power to an inverter for driving a power motor of a vehicle for a travel of a vehicle, when a start switch of the vehicle is turned off and then turned on by a driver at a first arithmetic unit abnormal time, by using the second arithmetic unit, which determines whether a connection condition of a positive and negative electrode side system main relays is satisfied by examining a voltage of a smoothing capacitor and puts the two system main relays in a conductive state when the connection condition is determined as satisfied.

14 Claims, 7 Drawing Sheets

SCENE EX : RESTART AFTER ABNORMAL OPERATION

ELECTRONIC CONTROL DEVICE

CROSS REFERENCE TO RELATED APPLICATION

The present application is based on and claims the benefit of priority of Japanese Patent Application No. 2019-108102, filed on Jun. 10, 2019, the disclosure of which is incorporated herein by reference.

TECHNICAL FIELD

The present disclosure generally relates to an electronic control device applicable to a vehicle having a relay means which is switchable between a conductive state and an interrupted state, the conductive state and the interrupted state conducting and interrupting electric power flowing between a high voltage battery and an inverter in the vehicle for driving a power motor of the vehicle.

BACKGROUND INFORMATION

The related art discloses a vehicle control device in a hybrid vehicle or an electric vehicle, which includes an inverter connected to a vehicle motor, a main battery that supplies electric power to the inverter, and a main relay that conducts or interrupts flow of electric current (i.e., conduction) between the main battery and the inverter, for controlling the main relay.

The vehicle control device is provided with a hold circuit that holds the conductive state of the main relay for a predetermined period of time when the main relay is in the conductive state and an interruption instruction is output from a control electronic control unit or ECU to the main relay. With this hold circuit, even if the control ECU is reset due to some abnormality while the vehicle is traveling and an interruption instruction is output to the main relay, the main relay can be held in the conductive state for a predetermined time without interruption. Therefore, if the control ECU restarts a normal operation during a hold period of the main relay by the hold circuit, the vehicle can then continue its travel without being noticed by a driver of the vehicle.

However, in the vehicle control device of the related art, if an abnormal state of the control ECU is not recoverable by reset, i.e., cannot be returned to the normal operation after resetting, the main relay may be interrupted due to the control ECU not restarting the normal operation after the lapse of the hold period by the hold circuit. In such case, since electric power is not supplied to the inverter, the vehicle may become unable to travel in the worst case. Further, even when a conduction instruction is output from the control ECU during the hold period and the conductive state of the main relay is maintained, there may also be a possibility that the inverter cannot be appropriately controlled due to the abnormality of the control ECU.

SUMMARY

It is an object of the present disclosure to provide an electronic control device that is capable of supplying electric power to an inverter that drives a power motor used for a travel of the vehicle in case that a driver of a vehicle turns off and then turns on a start switch when an abnormality occurs in a first arithmetic unit, without increasing the cost thereof.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
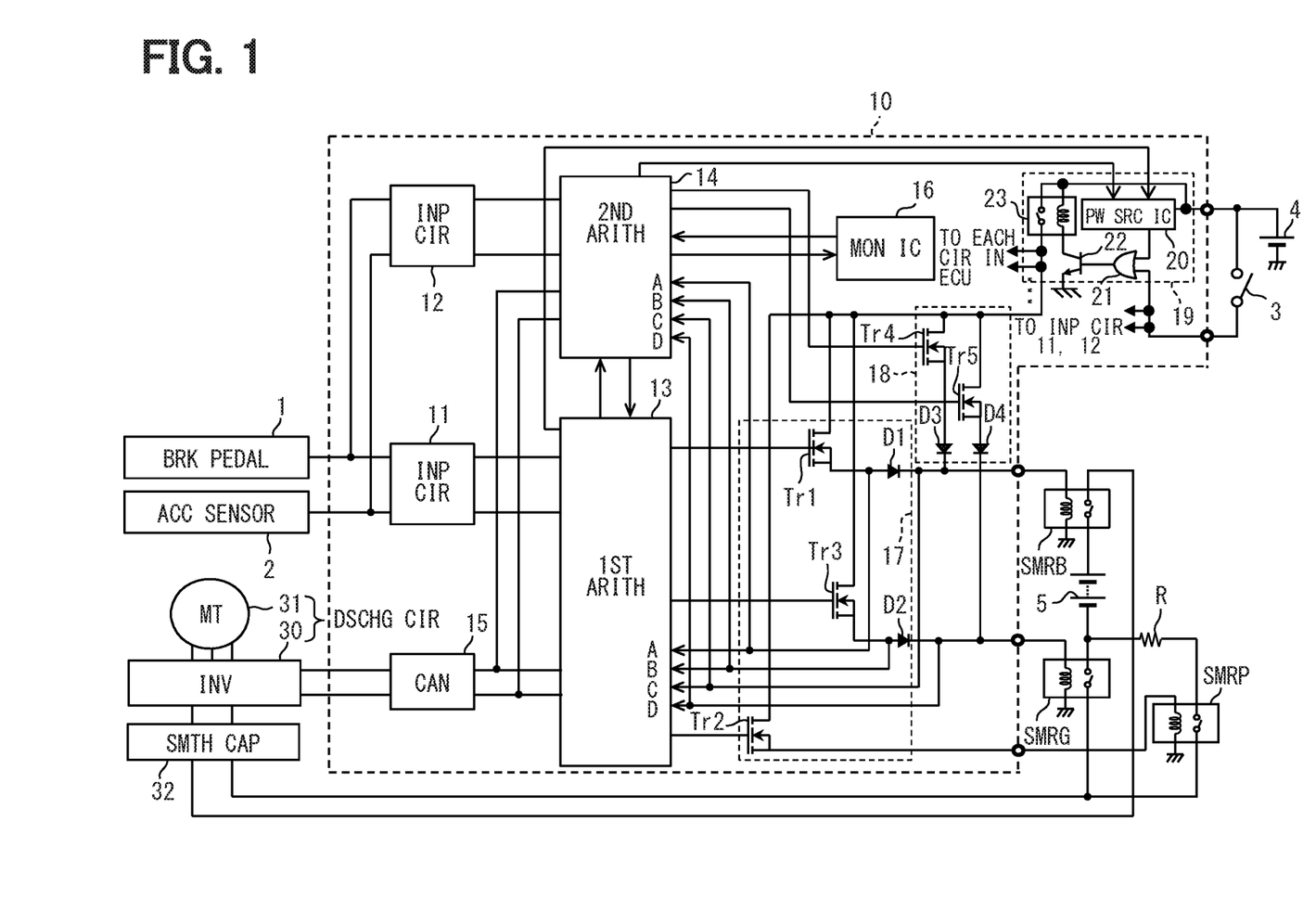
FIG. 1 is a block diagram of a control system including an electronic control device according to an embodiment.

Embodiments according to the present disclosure are described below with reference to the drawings. FIG. 1 is a block diagram of a configuration of a control system including an electronic control device 10 according to the present embodiment and a power motor 31 enabling a travel of a vehicle, which is a control object of the electronic control device 10, as well as system main relays SMRB, SMRG, SMRP, and the like. As shown in FIG. 1, a vehicle to which the electronic control device 10 according to the present embodiment is applied is an electric vehicle having a three-phase alternating current (AC) power motor 31 as a drive power source. The vehicle may further include an internal-combustion engine as a drive power source of the vehicle, and may also include a motor other than the power motor 31 as a drive power source of the vehicle.

The power motor 31 is driven by an inverter 30 using electric power supplied from the high voltage battery 5. The high voltage battery 5 is, for example, a lithium battery or a nickel battery, and can supply a direct current (DC) in high voltage of several hundred volts (for example, 300 V). A boost converter may be provided at a position between the high voltage battery 5 and the inverter 30 so that the boost converter can supply a boosted high voltage to the inverter 30.

In the present embodiment, as shown in FIG. 1, the inverter 30 is provided with a smoothing capacitor 32 that is charged by a voltage supplied from the high-voltage battery 5 via the system main relays SMRB, SMRG, SMRP. The smoothing capacitor 32 has a role of stabilizing the power supply voltage for the inverter 30 to drive the power motor 31.

The inverter 30 converts a direct current corresponding to the high voltage direct current supplied via the smoothing capacitor 32 into a three-phase alternating current and outputs the converted current to the power motor 31. The power motor 31 is rotationally driven by the three-phase AC current output from the inverter 30. Note that, by changing a current value of the three-phase AC current by the inverter 30, an output torque of the power motor 31 can be controlled and the vehicle can be driven at a desired speed.

Note that, when the rotation of the wheels of the vehicle is transmitted to the power motor 31 via an axle and a rotor of the power motor 31 is rotated, the power motor 31 functions as a generator to generate an alternating current. The alternating current generated by the power motor 31 is converted into a direct current by the inverter 30. The high voltage battery 5 is a secondary battery, and can store an electric power of the electric current converted into the direct current by the inverter 30.

A positive electrode side system main relay SMRB is provided between a positive electrode of the high voltage battery 5 and the inverter 30. At a position between a negative electrode of the high voltage battery 5 and the inverter 30, a negative electrode side system main relay SMRG is provided. Further, a series circuit of a starter system main relay SMRP and a resistor R is connected in parallel with the negative electrode side system main relay SMRG. The starter system main relay SMRP corresponds to a current limiting relay. Each of these three system main relays SMRB, SMRG, SMRP has a relay switch and a relay coil.

The three system main relays SMRB, SMRG, SMRP each switch the relay switch from an interrupted state to a conductive state according to a relay drive signal when the relay drive signal is transmitted according to a first relay control signal and/or a second relay control signal from a first arithmetic unit 13 and/or a second arithmetic unit 14 described later. For example, when the relay switches of the positive and negative electrode side system main relays SMRB, SMRG serving as a first group of the relays are switched to the conductive state, the high voltage battery 5 and the inverter 30 are electrically connected to each other, thereby a high voltage can be supplied from the voltage battery 5 to the inverter 30 and the high voltage battery 5 can be charged by the current converted into the direct current by the inverter 30. Conversely, the first relay control signal and/or the second relay control signal is stopped and the relay drive signal is not transmitted when the positive and negative electrode side system main relays SMRB and SMRG are in the conductive state, each of the system main relays SMRB, SMRG is switched to the interrupted state. In such case, the high voltage battery 5 and the inverter 30 are electrically disconnected.

The electronic control device 10 operates using electric power supplied from an in-vehicle battery 4 that generates a voltage lower than that of the high-voltage battery 5, and outputs, for example, (i) an instruction signal instructing an output of a drive signal for driving each of switching elements constituting the inverter 30 (e.g., a PWM signal) and (ii) a relay drive signal to each of the system main relays SMRB, SMRG, SMRP.

As shown in FIG. 1, the electronic control device 10 includes input circuits 11 and 12, the first arithmetic unit 13, the second arithmetic unit 14, a CAN (registered trademark, hereinafter the same) communication circuit 15, a monitoring IC 16, output circuits 17 and 18, a power supply circuit 19, and the like.

The input circuits 11 and 12 include, for example, circuits for performing input processing such as an amplifier circuit, a sampling circuit, an A/D conversion circuit and the like. The input circuit 11 performs input processing of signals from various sensors and switches such as a brake pedal sensor 1, an accelerator pedal sensor 2, a vehicle speed sensor, a resolver, a vehicle start switch 3 and the like, and outputs processing results to the first arithmetic unit 13.

Similarly, the input circuit 12 performs input processing of signals from various sensors and switches, and outputs the results to the second arithmetic unit 14. Further, the input circuit 12 is configured to input a signal from the smoothing capacitor 32, and to output a signal indicating a magnitude of a voltage charged in the smoothing capacitor 32 to the second arithmetic unit 14. Note that the first arithmetic unit 13 and the second arithmetic unit 14 may share one input circuit, in place of separately having the input circuits 11 and 12. The first arithmetic unit 13 and the second arithmetic unit 14 perform inverter control and relay control, which is described later, based on signals input from various sensors and switches.

The brake pedal sensor 1 detects a depression force of a brake pedal. The depression force may be detected from a brake hydraulic pressure, for example. Alternatively, a depression amount of the brake pedal may be detected as the depression force of the brake pedal. The accelerator pedal sensor 2 detects a depression amount of an accelerator pedal. The vehicle speed sensor detects a traveling speed of the vehicle, that is, a vehicle speed. The resolver detects a mechanical angle of the rotor of the power motor 31. Signals from these sensors may be input directly to the electronic control device 10, or may be provided from another ECU to the electronic control device 10.

The CAN communication circuit 15 transmits to the inverter 30 an instruction signal that instructs a drive signal for driving each of the switching elements of the inverter 30, which is output from the first arithmetic unit 13 or the second arithmetic unit 14. The inverter 30 generates a drive signal according to the received instruction signal, and drives each of the switching elements on and off by using the drive signal. Note that the first arithmetic unit 13 and the second arithmetic unit 14 may be configured to generate, for example, a PWM signal as a drive signal and to directly output the PWM signal to each of the switching elements of the inverter 30.

The first arithmetic unit 13 has a computer including a CPU, RAM, ROM, I/O, and a bus line connecting these components. In the first arithmetic unit 13, the CPU¥ performs a program stored in a non-transitory, tangible storage medium such as a ROM while using a temporary storage function of a RAM. Thus, an inverter control function and a relay control function for the three system main relays SMRB, SMRG, and SMRP are realized. When the above-described functions are performed, a method corresponding to the program is realized.

Similarly to the first arithmetic unit 13, the second arithmetic unit 14 has a computer including a CPU, RAM, ROM, I/O, and a bus line connecting these components. Further to the inverter control function and the relay control function for the positive and negative electrode side system main relays SMRB and SMRG, the second arithmetic unit 14 also performs a program stored in the ROM, so that a monitoring function of the first arithmetic unit 13 is realized. For example, the monitoring function performed by the second arithmetic unit 14 may employ a watch dog function that measures an interval between service pulses periodically output from the first arithmetic unit 13. Alternatively, the monitoring function by the second arithmetic unit 14 may compare an instruction signal for inverter control by the first arithmetic unit 13 with an instruction signal calculated by itself, and may determine whether a difference therebetween falls within a range of reference value.

However, in the present embodiment, an arithmetic processing capability of a computer included in the second arithmetic unit 14 is lower than the arithmetic processing capability of a computer included in the first arithmetic unit 13. Therefore, normally, the first arithmetic unit 13 performs the inverter control function to drive the power motor 31, and the second arithmetic unit 14 stops the inverter control function while performing the monitoring function for monitoring the operation of the first arithmetic unit 13, according to the program. When the second arithmetic unit 14 determines that the operation of the first arithmetic unit 13 is abnormal due to the monitoring function, the second arithmetic unit 14 performs the inverter control function in place of the first arithmetic unit 13. At such time, the second arithmetic unit 14 is programmed to perform a simple inverter control function, which is simpler than the one performed by the first arithmetic unit 13 so that, for example, so-called degenerative travel of the vehicle is enabled by the power motor 31 for allowing the vehicle to travel to a safe area. However, the second arithmetic unit 14 may be configured to have an arithmetic processing capability equivalent to that of the first arithmetic unit 13 and to perform inverter control similar to that of the first arithmetic unit 13.

When the second arithmetic unit 14 determines that the operation of the first arithmetic unit 13 is abnormal, the second arithmetic unit 14 continuously outputs a reset signal to the first arithmetic unit 13. Therefore, when the second arithmetic unit 14 performs inverter control, an instruction signal for inverter control is not output from the first arithmetic unit 13. In such manner, it is prevented that the instruction signal for inverter control is simultaneously output from both of the first arithmetic unit 13 and the second arithmetic unit 14 in the present embodiment.

Regarding the relay control function for controlling each of the system main relays SMRB, SMRG, SMRP, both of the first arithmetic unit 13 and the second arithmetic unit 14 are programmed to perform the relay control function from the start to the stop of the vehicle, to reliably prevent the power supply to the inverter 30 from being interrupted while the vehicle is traveling. The relay control for controlling the system main relays SMRB, SMRG, SMRP by the first and second arithmetic units 13, 14 is described later in detail.

The monitoring IC 16 is a so-called ASIC (Application Specific Integrated Circuit), and monitors whether the second arithmetic unit 14 is operating normally. For example, the monitoring IC 16 is configured as a watchdog timer that measures the interval between service pulses periodically output from the second arithmetic unit 14. In such case, when the measured time of interval exceeds a scheduled service pulse output interval, the monitoring IC 16 regards the operation of the second arithmetic unit 14 as abnormal, and outputs a reset signal to the second arithmetic unit 14. On the other hand, when the service pulse is periodically output from the second arithmetic unit 14 at the scheduled output interval, the monitoring IC 16 outputs a normal signal indicating that the operation of the second arithmetic unit 14 is normal to the second arithmetic unit 14. Note that the monitoring method of the operation of the second arithmetic unit 14 by the monitoring IC 16 is not limited to the above-described method, but may use any known monitoring method as long as it is applicable.

When the second arithmetic unit 14 determines an abnormal operation of the first arithmetic unit 13 by its own monitoring function, the second arithmetic unit 14 confirms that it is receiving a monitoring result (i.e., a normal signal) indicating that it is operating normally from the monitoring IC 16. When it is confirmed that the normal signal is received from the monitoring IC 16, the second arithmetic unit 14 determines that the operation of the first arithmetic unit 13 is abnormal. As described above, since the electronic control device 10 of the present embodiment has the monitoring IC 16, the second arithmetic unit 14 is prevented from erroneously determining that the operation of the first arithmetic unit 13 is abnormal when the first arithmetic unit 13 is operating normally.

The output circuit 17 outputs the relay drive signal to the system main relays SMRB, SMRG, SMRP, in accordance with the first relay control signal output from the first arithmetic unit 13, for enabling the first arithmetic unit 13 to perform a connection sequence of the system main relays SMRB, SMRG, and SMRP. More specifically, the output circuit 17 includes a first transistor Tr1 as an output unit for outputting a relay drive signal to the positive electrode side system main relay SMRB, a second transistor Tr2 as an output unit for outputting a relay drive signal to the starter system main relay SMRP, and a third transistor Tr3 as an output unit for outputting a relay drive signal to the negative electrode side system main relay SMRG. The first arithmetic unit 13 outputs drive signals for turning on the first to third transistors Tr1 to Tr3 as the first relay control signal.

Further, the output circuit 17 includes a diode D1 inserted at a position on a source side of the first transistor Tr1 than a junction where the outputs of the output circuit 18 merge on a connection line connecting the source of the first transistor Tr1 and the positive electrode side system main relay SMRB. Also, the output circuit 17 includes a diode D2 inserted at a position on the source side of the third transistor Tr3 than a junction where the outputs of the output circuit 18 merge on a connection line between the source of the third transistor Tr3 and the negative electrode side system main relay SMRG. These diodes D1 and D2 are provided to prevent an electric current from flowing from the output circuit 18 into the output circuit 17.

For the measurement of both-end potentials of the respective diodes D1 and D2, monitor lines respectively extending from ports A to D of the first and second arithmetic units 13 and 14 are connected to both ends of the diodes D1 and D2. More specifically, for example, a monitor line extending from the port A of the first arithmetic unit 13 and the second arithmetic unit 14 has one end connected to an anode of the diode D1 with the other end connected to the port A of both units 13 and 14. The other end of the monitor line having one end connected to a cathode of the diode D1 is connected to the port C of the first arithmetic unit 13 and the second arithmetic unit 14. Another monitor line extending from the port B of the first arithmetic unit 13 and the second arithmetic unit 14 has one end connected to an anode of the diode D2 with the other end connected to the port B of both units 13 and 14. The other end of the monitor line having one end connected to a cathode of the diode D2 is connected to the port D of the first arithmetic unit 13 and the second arithmetic unit 14.

The first arithmetic unit 13 and the second arithmetic unit 14 monitor the relay drive signal output from the output circuit 17 using the potentials at both ends of the diodes D1 and D2 captured from the ports A to D, and based on the monitoring results, an off failure of the first transistor Tr1 and an off failure of the third transistor Tr3 are detected. For example, when an off failure occurs from the state where the first transistor Tr1 is conductive, the electric current flowing from the first transistor Tr1 to the positive electrode side system main relay SMRB is interrupted. In such case, a cathode voltage Vc may be higher than an anode voltage Va of the diode D1 due to an induced voltage caused by the relay coil of the positive electrode side system main relay SMRB. Therefore, the first arithmetic unit 13 and the second arithmetic unit 14 can detect the OFF failure of the first transistor Tr1 with a monitoring result of Va<Vc. Alternatively, the first arithmetic unit 13 and the second arithmetic unit 14 may detect an off failure of the transistor Tr1 upon having a monitoring result that a potential difference between the anode voltage Va and the cathode voltage Vc of the diode D1 does not match a forward voltage drop due to the diode D1. Similarly, the first arithmetic unit 13 and the second arithmetic unit 14 can also detect an off failure of the second transistor Tr2.

The output circuit 18 outputs a relay drive signal to the positive and negative electrode side system main relays SMRB and SMRG in response to the second relay control signal output from the second arithmetic unit 14. More specifically, the output circuit 18 includes a fourth transistor Tr4 serving as an output unit for outputting a relay drive signal to the positive electrode side system main relay SMRB, and a fourth transistor Tr5 serving as an output unit for outputting a relay drive signal to the negative electrode side system main relay SMRG. The second arithmetic unit 14 outputs drive signals for the turning on of the fourth and fifth transistors Tr4 and Tr5 as the second relay control signal. As described above, the output circuit 18 that is an energization circuit that outputs a relay drive signal to each of the system main relays SMRB and SMRG according to the second relay control signal from the second arithmetic unit 14 does not have a configuration for an output of a relay drive signal to the starter system main relay SMRP.

An output from the source of the fourth transistor Tr4 of the output circuit 18 is connected to a connection line connecting the first transistor Tr1 of the output circuit 17 and the positive electrode side system main relay SMRB. The output circuit 18 includes a diode D3, which is disposed at a position close to the source side of the fourth transistor Tr4 than a junction where the output from the source of the fourth transistor Tr4 joins the connection line described above. Similarly, an output from the source of the fifth transistor Tr5 of the output circuit 18 is connected to a connection line connecting the third transistor Tr3 and the negative electrode side system main relay SMRG. The output circuit 18 includes a diode D4, which is disposed at a position close to the source side of the fifth transistor Tr5 than a junction where the output from the source of the fifth transistor Tr5 joins the connection line. These diodes D3 and D4 are provided to prevent electric current from flowing from the output circuit 17 into the output circuit 18. Although not shown in FIG. 1, in the output circuit 18 as well, the potentials at both ends of the diodes D3 and D4 may be taken into the first arithmetic unit 13 and the second arithmetic unit 14, for a detection of an off failure of the transistors Tr4 and Tr5.

The power supply circuit 19 includes a power supply IC 20, an OR circuit 21, a transistor 22, and a relay circuit 23. The power supply circuit 19 is provided so that electric power can be continuously supplied to each of the circuits in the electronic control device 10 including the first arithmetic unit 13 and the second arithmetic unit 14 even when the start switch 3 of the vehicle is turned off.

The power supply IC 20 always receives a supply of electric power from the in-vehicle battery 4, and can operate even when the start switch 3 is turned off. While receiving the power supply instruction signal from the first arithmetic unit 13 and/or the second arithmetic unit 14, the power supply IC 20 outputs an ON signal for turning on the transistor 22 to the OR circuit 21 described later.

Further to the ON signal output from the power supply IC 20 described above, a voltage signal from the in-vehicle battery 4 is input to the OR circuit 21 via the start switch 3.

The output of the OR circuit 21 is connected to a base of the transistor 22 connected to the coil of the relay circuit 23. The OR circuit 21 outputs a high level signal when at least one of an ON signal from the power supply IC 20 and a voltage signal from the in-vehicle battery 4 is input. When the high level signal is output from the OR circuit 21, the transistor 22 is turned on. Then, an electric current flows through the coil of the relay circuit 23, and a contact of the relay circuit 23 is turned on. In such manner, electric power is supplied to each of the circuits in the electronic control device 10 including the first arithmetic unit 13 and the second arithmetic unit 14 Further to the output circuits 17 and 18, as shown in FIG. 1, for operating those circuits. The output circuits 17 and 18 may be configured to be supplied with electric power via the start switch 3.

On the other hand, when neither the ON signal from the power supply IC 20 nor the voltage signal from the in-vehicle battery 4 is input to the OR circuit 21, the output signal from the OR circuit 21 becomes low level. Then, since the transistor 22 is turned off, energization to the coil of the relay circuit 23 is stopped. In such manner, the contact of the relay circuit 23 is turned off, and the power supply to each of the circuits in the electronic control device 10 is stopped. Note that, in the example shown in FIG. 1, the power supply circuit 19 is provided in the electronic control device 10. However, the power supply circuit 19 may be provided outside the electronic control device 10.

Further, as shown in FIG. 1, the voltage signal from the in-vehicle battery 4 via the start switch 3 is also given to the input circuits 11 and 12. Thereby, the first arithmetic unit 13 and the second arithmetic unit 14 can detect that the start switch 3 is turned off. When the start switch 3 is turned on and power supply is started, the first arithmetic unit 13 and the second arithmetic unit 14 output a power supply instruction signal to the power supply IC 20. Thereby, even if the start switch 3 is turned off, each of the circuits in the electronic control device 10 including the first arithmetic unit 13 and the second arithmetic unit 14 can continue the operation.

Figure 2:
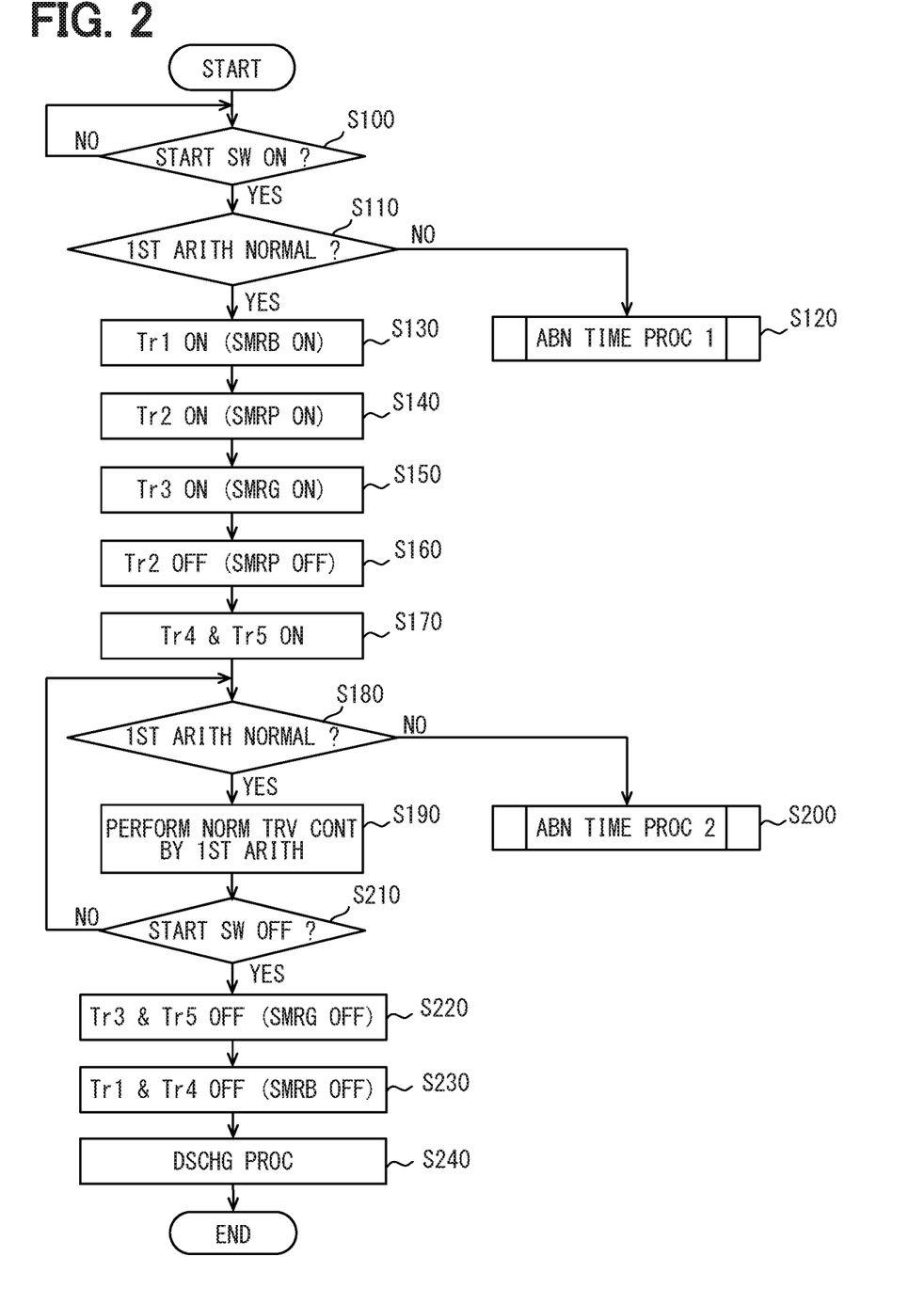
FIG. 2 is a flowchart of a control process performed by a first arithmetic unit and a second arithmetic unit of the electronic control device.
Figure 5:
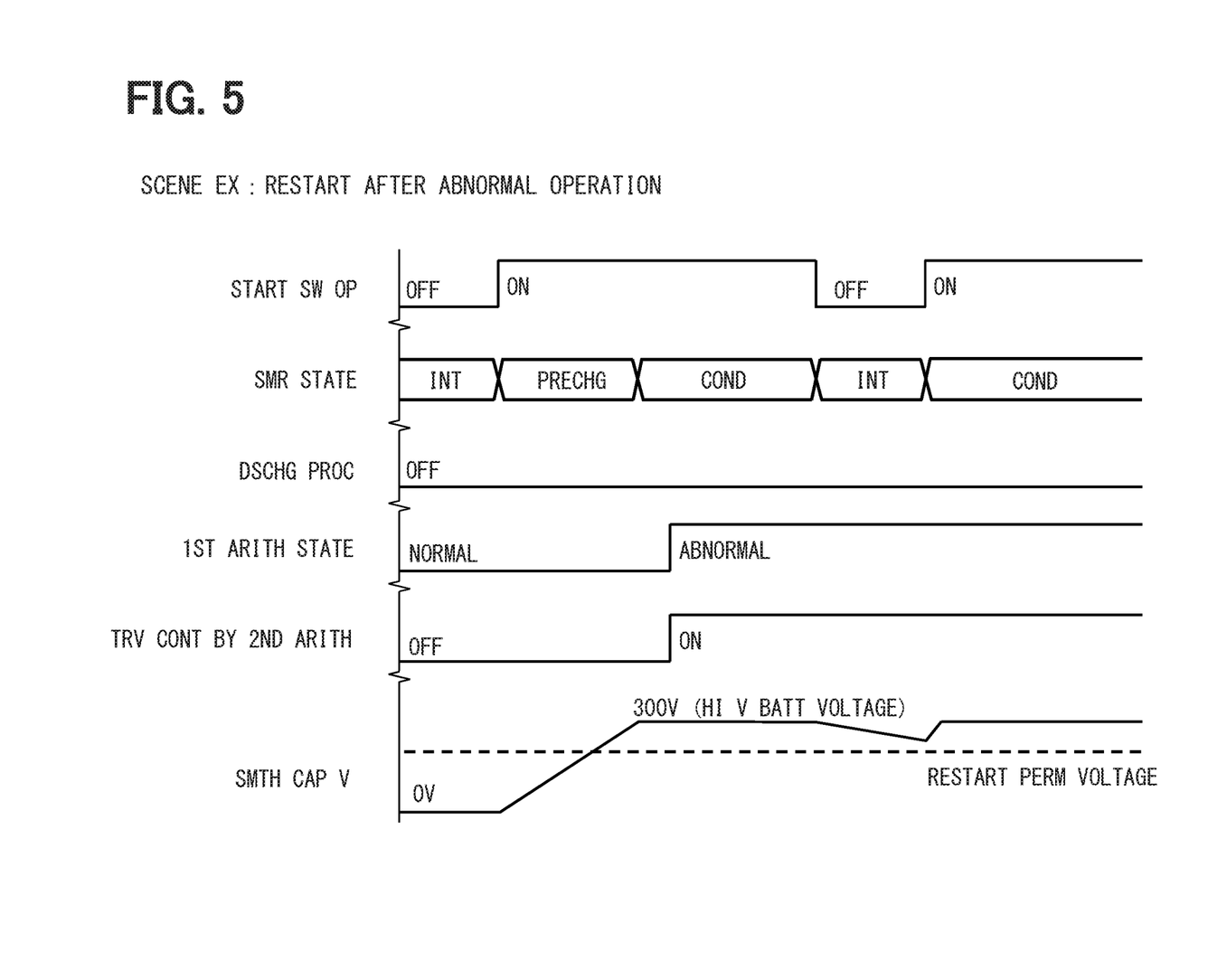
FIG. 5 is a timing chart about an effect of the SECOND abnormal time process performed by the second arithmetic unit.
Figure 6:
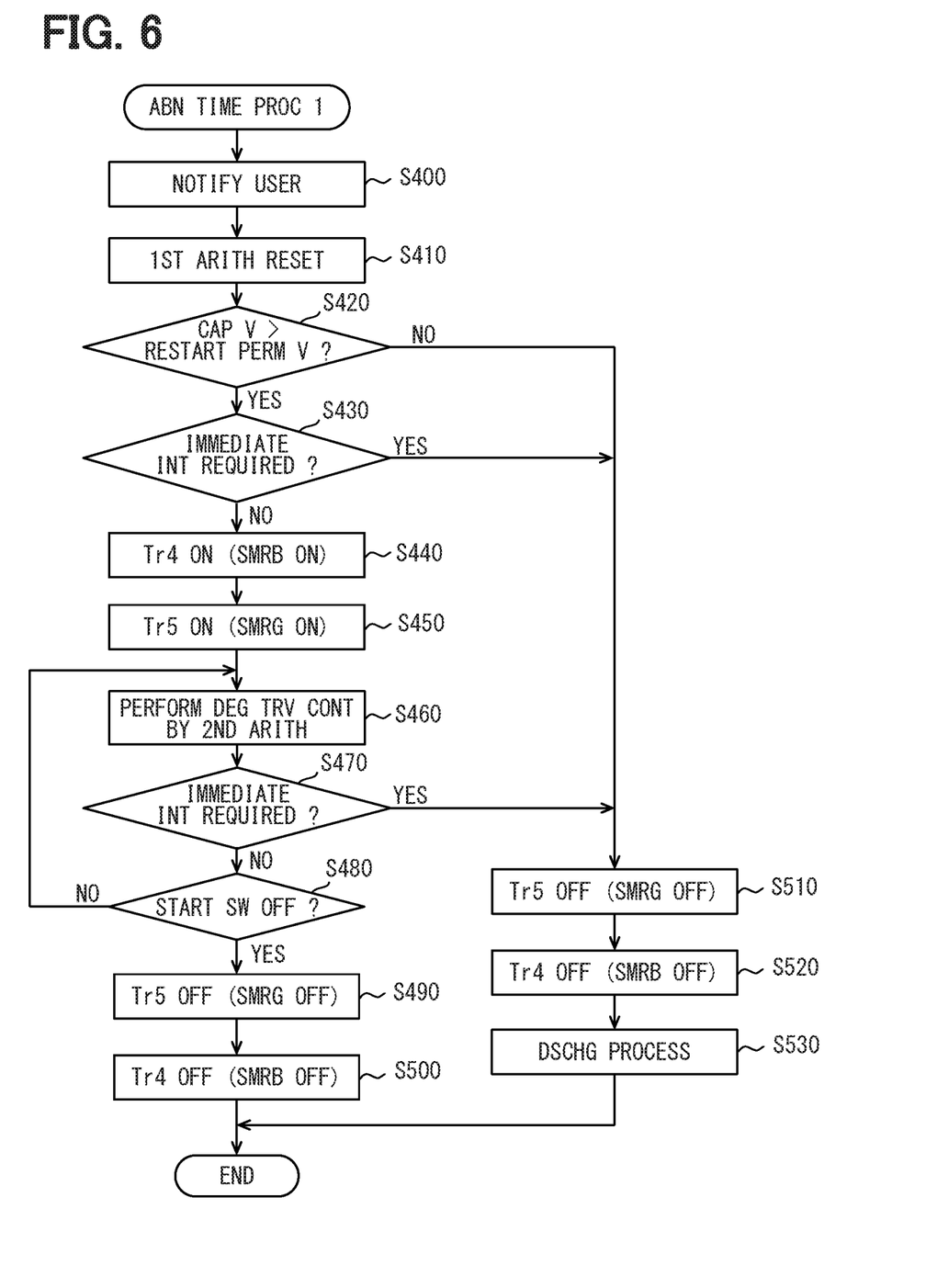
FIG. 6 is a flowchart of details of a FIRST abnormal time process performed by the second arithmetic unit when the operation of the first arithmetic unit becomes abnormal.
Figure 7:
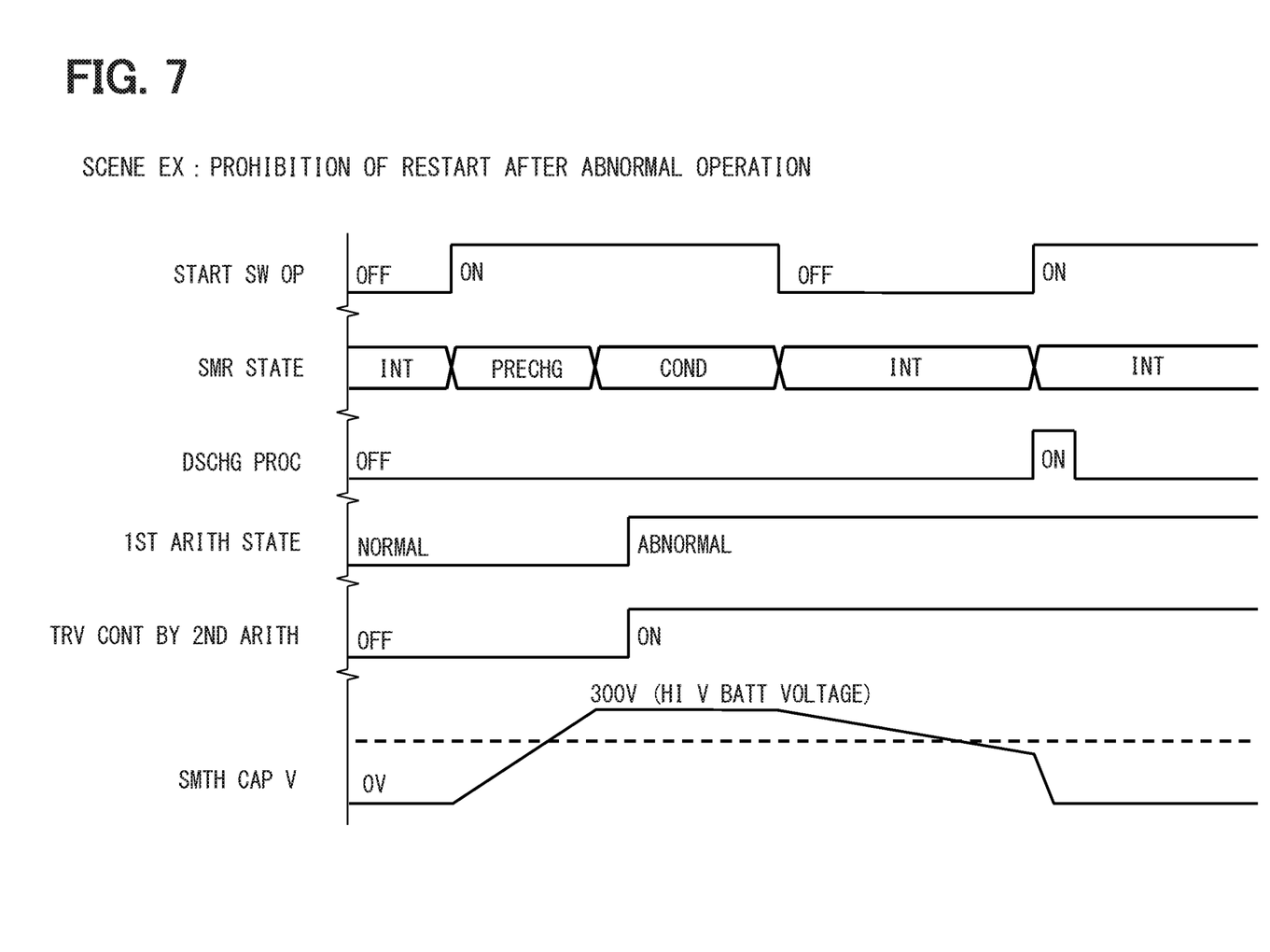
FIG. 7 is a timing chart about an effect of the FIRST abnormal time process performed by the second arithmetic unit.

Next, in the electronic control device 10 having the above-described configuration, the control processes performed by the first arithmetic unit 13 and the second arithmetic unit 14 are described with reference to the flowcharts of FIGS. 2, 4, and 6, and the timing charts of FIGS. 3, 5, and 7. The flowchart shown in FIG. 2 shows processing performed by the first arithmetic unit 13 and the second arithmetic unit 14 in cooperation.

First, in step S100, the first and second arithmetic units 13 and 14 determine whether or not the start switch 3 of the vehicle is turned on. When it is determined that the start switch 3 is turned on, the first and second arithmetic units 13 and 14 output a power supply instruction signal to the power supply IC 20 as described above. The process then proceeds to the next step S110. On the other hand, when the start switch 3 is not turned on, the process of step S100 is repeated until the start switch 3 is turned on.

In step S110, the second arithmetic unit 14 determines whether or not the first arithmetic unit 13 is operating normally. In this determination process, if it is determined that the first arithmetic unit 13 is operating normally, the process proceeds to step S130. On the other hand, if it is determined that the first arithmetic unit 13 is not operating normally, the process proceeds to step S120. The "abnormal time process 1" in step S120 is described later in detail with reference to the flowchart of FIG. 6.

In step S130, the first arithmetic unit 13 outputs a drive signal for turning on the first transistor Tr1. Thereby, an electric current flows through the relay coil of the positive electrode side system main system relay SMRB, and the relay switch of the positive electrode side system main system relay SMRB is turned on. Next, in step S140, the first arithmetic unit 13 outputs a drive signal for turning on the second transistor Tr2. Thereby, an electric current flows through the relay coil of the starter system main relay SMRP, and the relay switch of the starter system main relay SMRP is turned on. The timing at which the first arithmetic unit 13 outputs a drive signal to the second transistor Tr2 is set as follows. That is, the timing is set so that the starter system main relay SMRP is turned on after a predetermined time (for example, 100 to 150 ms) from a turning on of the positive electrode side system main relay SMRB.

When the positive electrode side system main relay SMRB and the starter system main relay SMRP are turned on, the high voltage battery 5 and the inverter 30 are electrically connected, and an electric current flows between them. However, the resistor R is connected in series to the starter system main relay SMRP. Therefore, it is possible to suppress a large current from flowing immediately after the starter system main relay SMRP is turned on due to the inrush current at the start-up time, and it is possible to prevent the occurrence of problems such as welding of relay contacts. When the suppressed current is supplied, the voltage of the smoothing capacitor 32 gradually increases toward a voltage of the high voltage battery as shown in the timing chart of FIG. 3.

Next, in step S150, the first arithmetic unit 13 outputs a drive signal for turning on the third transistor Tr3. Thereby, an electric current flows through the relay coil of the negative electrode side system main relay SMRG, and the relay switch of the negative electrode side system main relay SMRG is turned on. The timing at which the first arithmetic unit 13 outputs the drive signal to the third transistor Tr3 is also set so that the negative-side system main relay SMRG is turned on after a predetermined time (for example, 100 to 150 ms) from a turning on of the starter system main relay SMRP.

In subsequent step S160, the first arithmetic unit 13 stops the drive signal output to the second transistor Tr2 and turns off the second transistor Tr2. In such manner, the starter system main relay SMRP is turned off. The timing for stopping the drive signal to the second transistor Tr2 is set so that the starter system main relay SMRP is turned off after a predetermined time (for example, 20 to 30 ms) from a tuning on of the negative electrode side system main relay SMRG.

In step S170, the second arithmetic unit 14 outputs drive signals for turning on the fourth transistor Tr4 and the fifth transistor Tr5. More specifically, for example, after the first arithmetic unit 13 turns off the second transistor Tr2, the first arithmetic unit 13 notifies the second arithmetic unit 14 that the positive and negative electrode side system main relays SMRB and SMRG are respectively in a conductive state. Based on such notification, the second arithmetic unit 14 outputs drive signals for turning on the fourth and fifth transistors Tr4 and Tr5, respectively. Thus, the second arithmetic unit 14 can turn on the fourth and fifth transistors Tr4 and Tr5 after confirming that the positive and negative electrode side system main relays SMRB and SMRG are in a conductive state.

In such manner, the energization of the relay coil of the positive electrode side system main relay SMRB is performed in two systems: a system via the first transistor Tr1 and a system via the fourth transistor Tr4. Further, the energization of the relay coil of the negative electrode side system main relay SMRG is performed in two systems: a system via the third transistor Tr3 and a system via the fifth transistor Tr5. Therefore, for example, even if one of the transistors in the two systems has an off failure caused therein, the positive and negative electrode side system main relays SMRB and SMRG can be kept in an on state. Further, for example, when an abnormality occurs in the first arithmetic unit 13 and the second arithmetic unit 14 resets the first arithmetic unit 13, thereby stopping an output of a drive signal (ON) for turning on the first and third transistors Tr1 and Tr3 from the first arithmetic unit 13 (i.e., when the first relay control signal is not output), the fourth and fifth transistors Tr4 and Tr5 can remain turned on by the drive signal (i.e., the second relay control signal) output from the second arithmetic unit 14. Therefore, even when an abnormality occurs in the first arithmetic unit 13, the positive and negative electrode side system main relays SMRB and SMRG can be kept in an on state. In such manner, even if the above-described failure or abnormality occurs, electric power can be continuously supplied to the inverter 30 that drives the power motor 31.

Note that the second arithmetic unit 14 does not necessarily have to turn on the fourth and fifth transistors Tr4 and Tr5 at the same time. For example, the second arithmetic unit 14 can turn on the fourth transistor Tr4 at an arbitrary timing after the first arithmetic unit 13 turns on the positive electrode side system main relay SMRB. Similarly, the second arithmetic unit 14 can turn on the fifth transistor Tr5 at an arbitrary timing after the first arithmetic unit 13 turns on the negative electrode side system main relay SMRG.

Figure 3:
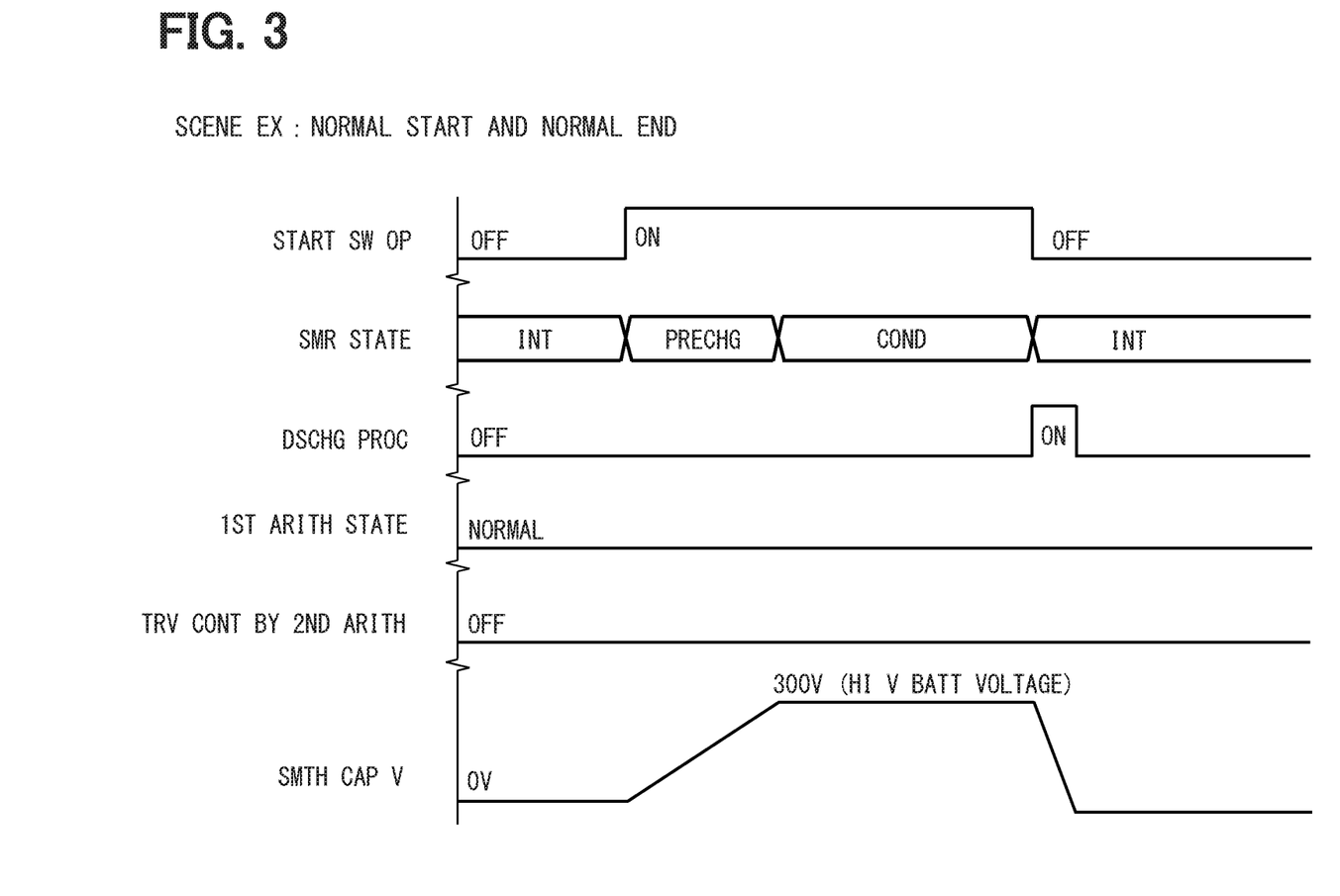
FIG. 3 is a timing chart of control performed by the first arithmetic unit and the second arithmetic unit.

By the processing of steps S130 and S140 described above, the positive electrode side system main relay SMRB and the starter system main relay SMRP are turned on, and the smoothing capacitor is charged with the suppressed current ("PRECHG" in FIG. 3). Further, the positive electrode side system main relay SMRB and the negative electrode side system main relay SMRG are turned on by the processing of steps S150 and S160, and the state of the system main relay SMR becomes the "COND(uctive)" state of FIG. 3. When the SMR state becomes "conductive" through "precharge," the vehicle can travel using the power motor 31 as a drive power source.

In subsequent step S180, the second arithmetic unit 14 determines whether or not the operation of the first arithmetic unit 13 is normal. In this determination process, as described above, the second arithmetic unit 14 determines that the operation of the first arithmetic unit 13 is abnormal when (i) the monitoring function of the arithmetic unit 14 itself has determined that the operation of the first arithmetic unit 13 is abnormal and (ii) the arithmetic unit 14 has received a normal signal from the monitoring IC 16. In other cases other than the above, the second arithmetic unit 14 determines that the operation of the first arithmetic unit 13 is normal. If it is determined in step S180 that the operation of the first arithmetic unit 13 is normal, the process proceeds to step S190. On the other hand, if the operation of the first arithmetic unit 13 is determined as abnormal, the process proceeds to step S200. Note that details of an "abnormal time process 2" in step S200 are described later in detail with reference to the flowchart of FIG. 5.

In step S190, the first arithmetic unit 13 performs inverter control. In such case, if the second arithmetic unit 14 is also operating normally, the relay coil of the positive electrode side system main relay SMRB is energized, while the vehicle is traveling, from two systems, i.e., from a system via the first transistor Tr1 and from a system via the fourth transistor Tr4. Further, the relay coil of the negative electrode side system main relay SMRG is energized from two systems: a system via the third transistor Tr3 and a system via the fifth transistor Tr5. Therefore, the inverter 30 is in a state where electric power for driving the power motor 31 is supplied from the high voltage battery 5. In such state, the first arithmetic unit 13 calculates a target torque that should be generated by the power motor 31 based on the inputs from the various sensors. Then, the first arithmetic unit 13 outputs to the inverter 30 an instruction signal indicating a drive signal for generating the target torque. In such manner, the power motor 31 generates the torque corresponding to the operation of the accelerator pedal by the driver or the operation of the brake pedal by the driver, as a normal traveling control.

In subsequent step S210, the first arithmetic unit 13 determines whether or not the start switch 3 of the vehicle is turned off. If it is determined that the start switch 3 has been turned off, the process proceeds to step S220. On the other hand, if it is determined that the start switch 3 is not turned off, the process returns to step S180 to continue control of the power motor 31.

In step S220, in order to turn off the negative electrode side system main relay SMRG, the first arithmetic unit 13 stops the drive signal to the third transistor Tr3, and the second arithmetic unit 14 stops the drive signal to the fifth transistor Tr5. The first and second arithmetic units 13 and 14 stop the drive signal substantially at the same time. In such manner, the negative electrode side system main relay SMRG is turned off.

Next, in step S230, in order to turn off the positive electrode side system main relay SMRB, the first arithmetic unit 13 stops the drive signal to the first transistor Tr1, and the second arithmetic unit 14 stops the drive signal to the fourth transistor Tr4. The first and second arithmetic units 13 and 14 stop the drive signal substantially at the same time. In such manner, the positive electrode side system main relay SMRB is turned off. Thus, the system main relay SMR is put in the "interrupted" state shown in the timing chart of FIG. 3.

Further, in step S240, the first arithmetic unit 13 performs a discharge process for rapidly discharging the high voltage charged in the smoothing capacitor 32. More specifically, for example, the first arithmetic unit 13 outputs for a preset period of time an instruction signal for the turning on of a certain pair of switching elements in the inverter 30 so that both ends of the smoothing capacitor 32 are connected via any one-phase motor coil of the power motor 31 as the discharge process. In such manner, since an electric current flows from the smoothing capacitor 32 using the motor coil as a resistance component, the voltage of the smoothing capacitor 32 rapidly decreases to 0 V as shown in the timing chart of FIG. 3. Thus, the high voltage accumulated in the smoothing capacitor 32 can be eliminated immediately after the end of the normal control. Note that, in the above-described case, as shown in FIG. 1, the inverter 30 and the power motor 31 serve as a discharge circuit, and the first arithmetic unit 13 serves as a discharge control unit. However, in place of using the inverter 30 and the power motor 31 as the discharge circuit, a dedicated discharge circuit may be provided. Further, in place of the first arithmetic unit 13, the second arithmetic unit 14 may serve as a discharge control unit. Alternatively, a dedicated control unit may be provided as the discharge control unit separately from the first and second arithmetic units 13 and 14.

Next, the "abnormal time process 2" in step S200 of the flowchart of FIG. 1 is described in detail with reference to the flowchart of FIG. 4.

As described above, the "abnormal time process 2" is performed when the operation of the first arithmetic unit 13 is determined as abnormal while the first arithmetic unit 13 is performing the normal travel control. At such time, at least the second arithmetic unit 14 outputs the second relay control signal, and the positive and negative electrode side system main relays SMRB and SMRG are turned on. That is, the state of the system main relay SMR is "conductive" as shown in the timing chart of FIG. 5, and electric power is supplied to the inverter 30. Therefore, the second arithmetic unit 14 may take over inverter control from the first arithmetic unit 13 in order to continue traveling of the vehicle.

In order to take over inverter control from the first arithmetic unit 13, the second arithmetic unit 14 first notifies a user that an abnormality has occurred in the first arithmetic unit 13 in step S300, by lighting a warning light provided in the meter cluster, for example. In subsequent step S310, the second arithmetic unit 14 continuously outputs a reset signal to the first arithmetic unit 13. This prevents an instruction signal for inverter control from being output from the first arithmetic unit 13 when the second arithmetic unit 14 performs inverter control.

Note that, the first arithmetic unit 13 will also stop the drive signal to the first transistor Tr1 and the drive signal to the 3rd transistor Tr3 by being reset continuously by the second arithmetic unit 14. However, when the second arithmetic unit 14 energizes the relay coil from a system via the fourth transistor Tr4, the positive electrode side system main relay SMRB can be kept in the conductive state, and, when the second arithmetic unit 14 energizes the relay coil from a system via the fifth transistor Tr5, the negative electrode side system main relay SMRG can be kept in the conductive state. Therefore, the state where electric power for driving the power motor 31 from the high voltage battery 5 is supplied to the inverter 30 is maintained. In such state, in step S320, the second arithmetic unit 14 performs inverter control for performing so-called degenerative travel for traveling the vehicle to a safe area by the power motor 31 based on the input from the various sensors. Thereby, even if an abnormality occurs in the first arithmetic unit 13, it is possible to prevent the vehicle from stopping shortly/immediately at such time.

In subsequent step S330, the second arithmetic unit 14 determines whether or not the positive and negative electrode side system main relays SMRB and SMRG need to be immediately interrupted. More specifically, the second arithmetic unit 14 determines whether it is necessary to immediately interrupt SMRB and SMRG based on whether or not it is in a situation that a high voltage part of a circuit such as the high voltage battery 5 or the smoothing capacitor 32 may possibly be exposed to the outside. For example, when the second arithmetic unit 14 determines that a subject vehicle has collided with something, i.e., an obstacle or the like, or upon receiving information to that effect from other arithmetic unit, the second arithmetic unit 14 can determine that there is a possibility that the high voltage part is exposed to the outside by the collision. Further, when the second arithmetic unit 14 detects that an interlock that locks a cover covering the high voltage part is released for service work such as inspection and/or maintenance, the second arithmetic unit 14 can determine that there is a possibility that the high voltage part is exposed to the outside by such work. If it is determined in step S330 that it is necessary to immediately interrupt the relay, the second arithmetic unit 14 proceeds to the process of step S340. On the other hand, if it is determined that it is not necessary to immediately interrupt the relay, the second arithmetic unit 14 proceeds to the process of step S370.

In step S340, the second arithmetic unit 14 stops the drive signal to the fifth transistor Tr5 in order to turn off the negative electrode side system main relay SMRG. Further, in step S350, the second arithmetic unit 14 stops the drive signal to the fourth transistor Tr4 in order to turn off the positive electrode side system main relay SMRB. In such manner, the state of the system main relay SMR is changed to the "interrupted" state. Further, in step S360, the second arithmetic unit 14 performs a discharge process for rapidly discharging the high voltage charged in the smoothing capacitor 32. In such manner, the high voltage accumulated in the smoothing capacitor 32 is immediately eliminated, and the occurrence of an electric shock or the like is prevented when the high voltage part is exposed to the outside.

On the other hand, in step S370, the second arithmetic unit 14 determines whether the start switch 3 of the vehicle has been turned off. If it is determined that the start switch 3 has been turned off, the process proceeds to step S380. On the other hand, when the second arithmetic unit 14 determines that the start switch 3 is not turned off, the process returns to the step S210 in order to continue the degenerative travel control.

In step S380, the second arithmetic unit 14 stops the drive signal to the fifth transistor Tr5 in order to turn off the negative electrode side system main relay SMRG. Further, in step S390, the second arithmetic unit 14 stops the drive signal to the fourth transistor Tr4 in order to turn off the positive electrode side system main relay SMRB. However, in such case, as shown in the timing chart of FIG. 5, the discharge process is not performed and the high voltage of the smoothing capacitor 32 is maintained. That is, when an abnormality occurs in the first arithmetic unit 13, or, in other words, when the start switch 3 is turned off when the second arithmetic unit 14 takes over inverter control from the first arithmetic unit 13, the discharge process is not performed. Note that the high voltage of the smoothing capacitor 32 gradually decreases due to natural discharge, as shown in the timing chart of FIG. 5.

When the start switch 3 is turned on again while the high voltage is held in the smoothing capacitor 32, if the abnormality of the first arithmetic unit 13 is continuing, after performing the processing of steps S100 and S110 in the flowchart of FIG. 2, the "abnormal time process 1" in step S120 is performed. Details of the "abnormal time process 1" are described below with reference to the flowchart of FIG. 6.

First, in step S400, the user is notified that an abnormality has occurred in the first arithmetic unit 13 by lighting a warning lamp provided in the meter cluster. In step S410, the second arithmetic unit 14 continuously outputs a reset signal to the first arithmetic unit 13.

In the subsequent step S420, it is determined whether or not the voltage held in the smoothing capacitor 32 is higher than a restart permission voltage determined with reference to the voltage of the high voltage battery 5. If the voltage of the smoothing capacitor 32 is higher than the restart permission voltage, there is a low possibility that a large current that causes problems such as welding of relay contacts flows when the positive and negative electrode side system main relays SMRB, SMRG are directly put in the conductive state, without performing the precharge by putting the positive electrode side and starter system main relays SMRB, SMRP in the conductive state. Therefore, when it is determined that an abnormality has occurred in the first arithmetic unit 13, a connection condition of the positive electrode side and the starter system main relays SMRB, SMRP (i.e., a first group of the relays) by the second arithmetic unit 14 is determined as whether or not the voltage of the smoothing capacitor 32 is higher than the restart permission voltage. If it is determined that the voltage of the smoothing capacitor 32 is higher than the restart permission voltage, the process proceeds to step S430. If it is determined that the voltage of the smoothing capacitor 32 is equal to or lower than the restart permission voltage, the process proceeds to step S510.

Note that the connection condition of the positive electrode side and the starter system main relays SMRB and SMRP is not limited to a condition of whether the relevant voltage is higher than the restart permission voltage described above. For example, as the connection condition, a reconnection permission time may be determined based on the rate of decrease of the high voltage held in the smoothing capacitor 32 due to natural discharge. Then, if the lapse time from turning off to turning on of the start switch 3 is less than the reconnection permission time, the voltage of the smoothing capacitor 32 may be regarded as satisfying the connection condition.

In step S430, the second arithmetic unit 14 determines whether the positive and negative electrode side system main relays SMRB and SMRG need to be immediately interrupted. This determination process is the same as step S330 in the flowchart of FIG. 4 described above. Thus, in the present embodiment, when the first arithmetic unit 13 is abnormal, the start switch 3 of the vehicle is turned off, and when the start switch 3 is turned on thereafter, the second arithmetic unit 14 determines whether the positive and negative electrode side system main relays SMRB and SMRG need to be immediately interrupted. That is, a determination of whether or not the high voltage part is likely to be exposed to the outside is performed before switching the positive and negative electrode side system main relays SMRB and SMRG to the conductive state. Therefore, when service work is performed, it becomes easier to ensure safety. If it is determined in step S430 that it is not necessary to immediately interrupt the relay, the process proceeds to step S440. If it is determined that it is necessary to immediately interrupt the relay, the process proceeds to step S510.

In step S440, the second arithmetic unit 14 outputs a drive signal to the fourth transistor Tr4 in order to turn on the positive electrode side system main relay SMRB. Further, in step S450, the second arithmetic unit 14 outputs a drive signal to the fifth transistor Tr5 in order to turn on the negative electrode side system main relay SMRG. Thereby, as shown in the timing chart of FIG. 5, the state of the system main relay SMR becomes the "conductive" state. Further, the voltage of the smoothing capacitor 32 is rapidly charged toward the power supply voltage of the high voltage battery 5 from a state where it has been slightly reduced by natural discharge. However, since the amount of electric current flowing at this time is not so large, there is no possibility of problems such as welding of the relay contacts.

Figure 4:
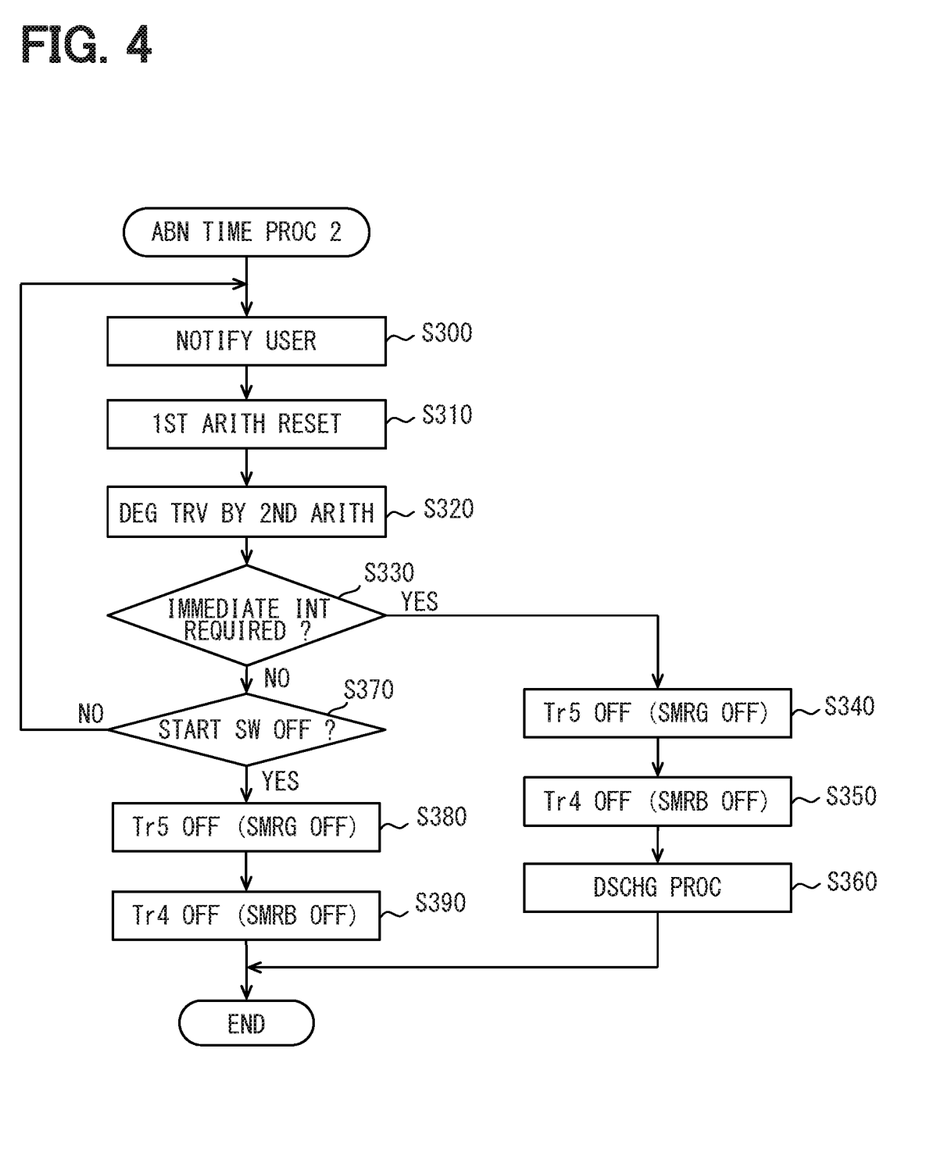
FIG. 4 is a flowchart of details of a SECOND abnormal time process performed by the second arithmetic unit when an operation of the first arithmetic unit becomes abnormal.

The processing from step S460 to S500 is substantially the same as the processing from step S320 to S390 in the flowchart of FIG. 4. That is, the description is not repeated. Even if the start switch 3 is turned off for any reason while the second arithmetic unit 14 is performing the degenerative travel control immediately after the start switch 3 is turned on by the processing from steps S460 to S500, a high voltage is held in the smoothing capacitor 32. Therefore, even when the start switch 3 is turned on, the vehicle is enabled to travel by the degenerative travel control by the second arithmetic unit 14. Further, when a situation occurs (i.e., the vehicle is in a situation) in which the high voltage part may be exposed to the outside due to a collision or the like while the vehicle is traveling, the positive and negative electrode side system main relays SMRB and SMRG are promptly interrupted, and the discharge process can be performed.

On the other hand, in step S510, which is performed when it is determined in step S420 described above that the voltage of the smoothing capacitor 32 is equal to or lower than the restart permission voltage, the second arithmetic unit 14 stops the drive signal to the fifth transistor Tr5 (or keeps a signal stopped state already in effect). Further, in step S520, the second arithmetic unit 14 stops the drive signal to the fourth transistor Tr4 (or keeps a signal stopped state already in effect). Furthermore, in step S530, the second arithmetic unit 14 performs a discharge process as shown in the timing chart of FIG. 7. In such manner, the voltage of the smoothing capacitor 32 rapidly decreases to 0 V as shown in the timing chart of FIG. 7. By such processing, when the voltage of the smoothing capacitor 32 is equal to or lower than the restart permission voltage, connecting the electrode and negative electrode side system main relays SMRB and SMRG by the second arithmetic unit 14 is avoided.

As described above, according to the electronic control device 10 of the present embodiment, when the start switch 3 is turned off and then the start switch 3 is turned on thereafter, the second arithmetic unit 14 determines whether the voltage of the smoothing capacitor 32 satisfies the connection condition that allows the positive and negative electrode side system main relays SMRB and SMRG to be put in the conductive state. When the second arithmetic unit 14 determines that the voltage of the smoothing capacitor 32 satisfies the connection condition, the second arithmetic unit 14 brings the positive and negative electrode side system main relays SMRB and SMRG into the conductive state. In such manner, electric power is supplied to the inverter 30 that drives the power motor 31. Therefore, the second arithmetic unit 14 can control the traveling of the vehicle by the inverter control signal.

The preferred embodiments of the present disclosure have been described above. However, the present disclosure is not limited to the above-described embodiments, but various modifications can be made without departing from the spirit of the present disclosure.

In the electronic control apparatus 10 according to the embodiments described above, the output circuit 18 includes the fourth transistor Tr4 for outputting the relay drive signal to the positive electrode side system main relay SMRB and the fifth transistor Tr5 for outputting the relay drive signal to the negative electrode side system main relay SMRG. However, in the output circuit 18, one transistor may be used for outputting the relay drive signal to the positive electrode side system main relay SMRB and for outputting the relay drive signal to the negative electrode side system main relay SMRG. In such manner, the configuration of the output circuit 18 can be simplified.

Further, in the electronic control device 10 according to the above-described embodiments, two output circuits are provided, i.e., the output circuit 17 that outputs a relay drive signal in response to the first relay control signal from the first arithmetic unit 13 and the output circuit 18 that outputs a relay drive signal in response to the second relay control signal are provided. However, one output circuit may be shared among the first arithmetic unit 13 and the second arithmetic unit 14. In other words, two drive signal lines, i.e., one from the first arithmetic unit 13 and one from the second arithmetic unit 14, may be connected to the same gate of a first "shared" transistor for outputting the relay drive signal to the positive electrode side system main relay SMRB, and two drive signal lines, i.e., one from the first arithmetic unit 13 and one from the second arithmetic unit 14, may be connected to the same gate of a second "shared" transistor for outputting the relay drive signal to the negative electrode side system main relay SMRG. Even with such a configuration, it is possible to avoid the occurrence of a situation in which electric power cannot be supplied from the high voltage battery 5 to the inverter 30 when an abnormality occurs in the first arithmetic unit 13.

Further, in the above-described embodiments, two relays of the positive electrode side system main relay SMRB and the starting system main relay SMRP are interposed at a position between the high voltage battery 5 and the inverter 30 at the start-up time of the vehicle system, and two relays of the positive electrode side system main relay SMRB and the negative electrode side system main relay SMRG are interposed at the same position at/during the travel time of the vehicle. However, the number of relays interposed at such position at the start-up time and during the travel time may be only one. In such case, at the start-up time, a system main relay to which a resistor is connected in series may be interposed at a position between the high voltage battery 5 and the inverter 30 to limit the electric current, and, during the travel time, a system main relay without having a resistor may be interposed at such position.

The arithmetic units and relevant methods described in the present disclosure may be implemented/realized by programming a special purpose computer which is configured with a memory and a processor programmed to execute one or more particular functions embodied as computer programs. Alternatively, the arithmetic units described in the present disclosure and the method thereof may be realized by a special purpose computer configured as a processor having one or more dedicated hardware logic circuits. Alternatively, the arithmetic units and the method described in the present disclosure may be realized by one or more special purpose computers, which is a combination of (i) a programmable special purpose computer having a processor and a memory, which are programmed to perform one or more functions, and (ii) a hardware-logic special purpose computer having a processor with one or more hardware logic circuits. The computer programs may be stored, as instructions being performed by a computer, in a tangible, non-transitory computer-readable storage medium.

What is claimed is:

1. An electronic control device,
applicable to a vehicle that includes a first relay means and a second relay means respectively switchable between a conductive state and an interrupted state for a conduction and an interruption of electric power between a high voltage battery and an inverter disposed in the vehicle for driving a power motor enabling a travel of the vehicle, wherein
the first relay means is configured to be kept in the conductive state during a travel of the vehicle,
the second relay means is configured to flow a restricted amount of electric current between the high voltage battery and the inverter when the first relay means is in the conductive state by a turning on of a start switch at a start-up time of the vehicle, and
the inverter is provided with a smoothing capacitor (i) that is charged by a voltage supplied from the high voltage battery via the relays and (ii) that stabilizes a power supply voltage for the driving of the power motor, wherein the electronic control device comprises:

a first arithmetic unit for controlling the first and second relay means, and the controlling of the first and second relay means is performed by outputting an inverter control signal to the inverter for the driving of the power motor, wherein (i) the controlling of the first and second relay means is further performed by switching the second relay means to the conductive state at the start-up time of the vehicle due to the turning on of the start switch, and (ii) the controlling of the first and second relay means thereafter is further performed by switching the first relay means to the conductive state in place of the second relay means and by keeping the first relay means in the conductive state; and a second arithmetic unit separately provided from the first arithmetic unit for controlling the travel of the vehicle in place of the first arithmetic unit at a first arithmetic unit abnormal time, and the controlling of the travel of the vehicle is performed (a) by outputting the inverter control signal to the inverter and (b) by outputting a relay control signal to the first relay means for bringing the first relay means to the conductive state, wherein when (i) the start switch of the vehicle is turned off at the first arithmetic unit abnormal time when the first arithmetic unit is abnormal, and (ii) thereafter the start switch of the vehicle is turned on, the second arithmetic unit (a) determines whether a voltage of the smoothing capacitor satisfies a connection condition of the first relay means, and (b) upon having a positive determination about a satisfaction of the connection condition, switches the first relay means to the conductive state by outputting the relay control signal to the first relay means for switching a current/power supply path between a system start-up time and a vehicle travel time, for enabling a control of the travel of the vehicle, and the first relay means is provided between the high voltage battery and the inverter for the switching of the current/power supply path between the start-up time and the vehicle travel time.

2. The electronic control device according to claim 1 further comprising:

a discharger configured to perform a discharge process for discharging electric charge charged in the smoothing capacitor, wherein the discharger performs the discharge process and immediately discharges the electric charge of the smoothing capacitor when the start switch of the vehicle is turned off when the first arithmetic unit is normal, while refraining from performing the discharge process when the start switch of the vehicle is turned off when the first arithmetic unit is abnormal.

3. The electronic control device according to claim 1, wherein the second arithmetic unit is configured to control the discharger to perform the discharge process in case that the voltage of the smoothing capacitor is determined as not satisfying the connection condition of the first group of the relays when (i) the start switch of the vehicle is turned off when the first arithmetic unit is abnormal at the first arithmetic unit abnormal time, and (ii) thereafter the vehicle start switch is turned on.

4. The electronic control device according to claim 2, wherein the discharger includes:

a discharge circuit connecting both ends of the smoothing capacitor via a resistance component; and a discharge control unit configured to turn on or off a switching element provided in the discharge circuit, wherein the discharge control unit is at least provided by the second arithmetic unit.

5. The electronic control device according to claim 2, wherein the second arithmetic unit is configured to determine whether or not it is in a situation that a high voltage part may possibly be exposed to an outside, and controls the discharger to perform the discharge process when it is determined that it is in the situation the high voltage part may possibly be exposed to the outside.

6. The electronic control device according to claim 5, wherein, when (i) the start switch of the vehicle is turned off when the first arithmetic unit is abnormal and (ii) thereafter the vehicle start switch is turned on, the second arithmetic unit performs the determination of whether or not it is in the situation that the high voltage part may possibly be exposed to the outside before switching the first group of the relays to the conductive state.

7. The electronic control device according to claim 5, wherein the second arithmetic unit determines whether or not it is in the situation that the high voltage part may possibly be exposed to the outside after switching the first group of the relays to the conductive state, and when it is determined that it is in the situation that the high voltage part may possibly be exposed to the outside, the second arithmetic unit switches the first group of the relays to the interrupted state in addition to controlling the discharger to perform the discharge process.

8. The electronic control device according to claim 1, wherein the second arithmetic unit determines that the connection condition of the first group of the relays is satisfied when the voltage of the smoothing capacitor is equal to or higher than a predetermined voltage based on the voltage of the high voltage battery.

9. The electronic control device according to claim 1, wherein the second arithmetic unit has a monitoring function for monitoring whether an operation of the first arithmetic unit is normal, and when it is determined that the operation of the first arithmetic unit is abnormal, the second arithmetic unit resets the first arithmetic unit, and performs inverter control in place of the first arithmetic unit.

10. The electronic control device according to claim 1, wherein, the first relay means includes a positive electrode side relay provided at a position between a positive electrode of the high voltage battery and the inverter, and a negative electrode side relay provided at a position between a negative electrode of the high voltage battery and the inverter, and the second relay means includes the positive electrode side relay provided at a position between the positive electrode of the high voltage battery and the inverter, and a current limiting relay provided at a position between the negative electrode of the high voltage battery and the inverter to which a resistor is connected in series.

11. An electronic control device,
applicable to a vehicle that includes a first relay means and a second relay means respectively switchable between a conductive state and an interrupted state for a conduction and an interruption of electric power between a high voltage battery and an inverter disposed in the vehicle for driving a power motor enabling a travel of the vehicle, wherein
the first relay means is configured to be kept in the conductive state during a travel of the vehicle,
the second relay means is configured to flow a restricted amount of electric current between the high voltage battery and the inverter when the first relay means is in the conductive state by a turning on of a start switch at a start-up time of the vehicle, and
the inverter is provided with a smoothing capacitor (i) that is charged by a voltage supplied from the high voltage battery via the relays and (ii) that stabilizes a power supply voltage for the driving of the power motor, wherein
the electronic control device comprises:
a first arithmetic unit for controlling the first and second relay means, and
the controlling of the first and second relay means is performed by outputting an inverter control signal to the inverter for the driving of the power motor, wherein
  (i) the controlling of the first and second relay means is further performed by switching the second relay means to the conductive state at the start-up time of the vehicle due to the turning on of the start switch, and
  (ii) the controlling of the first and second relay means thereafter is further performed by switching the first relay means to the conductive state in place of the second relay means and by keeping the first relay means in the conductive state; and
a second arithmetic unit separately provided from the first arithmetic unit for controlling the travel of the vehicle in place of the first arithmetic unit at a first arithmetic unit abnormal time, and the controlling of the travel of the vehicle is performed (a) by outputting the inverter control signal to the inverter and (b) by outputting a relay control signal to the first relay means for bringing the first relay means to the conductive state,
wherein
when (i) the start switch of the vehicle is turned off at the first arithmetic unit abnormal time when the first arithmetic unit is abnormal, and (ii) thereafter the start switch of the vehicle is turned on, the second arithmetic unit (a) determines whether a voltage of the smoothing capacitor satisfies a connection condition of the first relay means, and (b) upon having a positive determination about a satisfaction of the connection condition, switches the first relay means to the conductive state by outputting the relay control signal to the first relay means, for enabling a control of the travel of the vehicle,
the first group of the relay means include a positive electrode side relay provided at a position between a positive electrode of the high voltage battery and the inverter, and a negative electrode side relay provided at a position between a negative electrode of the high voltage battery and the inverter, and
the second group of the relay means include the positive electrode side relay provided at a position between the positive electrode of the high voltage battery and the inverter, and a current limiting relay provided at a position between the negative electrode of the high voltage battery and the inverter to which a resistor is connected in series.

12. An electronic control device,
applicable to a vehicle that includes a first relay means and a second relay means respectively switchable between a conductive state and an interrupted state for a conduction and an interruption of electric power between a high voltage battery and an inverter disposed in the vehicle for driving a power motor enabling a travel of the vehicle, wherein
the first relay means is configured to be kept in the conductive state during a travel of the vehicle,
the second relay means is configured to flow a restricted amount of electric current between the high voltage battery and the inverter when the first relay means is in the conductive state by a turning on of a start switch at a start-up time of the vehicle, and
the inverter is provided with a smoothing capacitor (i) that is charged by a voltage supplied from the high voltage battery via the relays and (ii) that stabilizes a power supply voltage for the driving of the power motor, wherein
the electronic control device comprises:
a first arithmetic unit for controlling the first and second relay means, and
the controlling of the first and second relay means is performed by outputting an inverter control signal to the inverter for the driving of the power motor, wherein
  (i) the controlling of the first and second relay means is further performed by switching the second relay means to the conductive state at the start-up time of the vehicle due to the turning on of the start switch, and
  (ii) the controlling of the first and second relay means thereafter is further performed by switching the first relay means to the conductive state in place of the second relay means and by keeping the first relay means in the conductive state;
a second arithmetic unit separately provided from the first arithmetic unit for controlling the travel of the vehicle in place of the first arithmetic unit at a first arithmetic unit abnormal time, and the controlling of the travel of the vehicle is performed (a) by outputting the inverter control signal to the inverter and (b) by outputting a relay control signal to the first relay means for bringing the first relay means to the conductive state; and
a discharger configured to perform a discharge process for discharging electric charge charged in the smoothing capacitor,
wherein
when (i) the start switch of the vehicle is turned off at the first arithmetic unit abnormal time when the first arithmetic unit is abnormal, and (ii) thereafter the start switch of the vehicle is turned on, the second arithmetic unit (a) determines whether a voltage of the smoothing capacitor satisfies a connection condition of the first relay means, and (b) upon having a positive determination about a satisfaction of the connection condition, switches the first relay means to the conductive state by outputting the relay control signal to the first relay means, for enabling a control of the travel of the vehicle, the discharger performs the discharge process and immediately discharges the electric charge of the smoothing capacitor when the start switch of the vehicle is turned off when the first arithmetic unit is normal, while refraining from performing the discharge process when the start switch of the vehicle is turned off when the first arithmetic unit is abnormal, and the second arithmetic unit is configured to determine whether or not it is in a situation that a high voltage part may possibly be exposed to an outside, and controls the discharger to perform the discharge process when it is determined that it is in the situation the high voltage part may possibly be exposed to the outside.

13. The electronic control device according to claim 12, wherein, when (i) the start switch of the vehicle is turned off when the first arithmetic unit is abnormal and (ii) thereafter the vehicle start switch is turned on, the second arithmetic unit performs the determination of whether or not it is in the situation that the high voltage part may possibly be exposed to the outside before switching the first group of the relays to the conductive state.

14. The electronic control device according to claim 12, wherein the second arithmetic unit determines whether or not it is in the situation that the high voltage part may possibly be exposed to the outside after switching the first group of the relays to the conductive state, and when it is determined that it is in the situation that the high voltage part may possibly be exposed to the outside, the second arithmetic unit switches the first group of the relays to the interrupted state in addition to controlling the discharger to perform the discharge process.

* * * * *